United States Patent
Nakashima

(10) Patent No.: US 10,122,489 B2
(45) Date of Patent: Nov. 6, 2018

(54) POLARIZATION STATE DETECTOR, OPTICAL TRANSMITTER, AND OPTICAL RECEIVER

(71) Applicant: FUJITSU LIMITED, Kawasaki-shi, Kanagawa (JP)

(72) Inventor: Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 14/666,527

(22) Filed: Mar. 24, 2015

(65) Prior Publication Data

US 2015/0280856 A1 Oct. 1, 2015

(30) Foreign Application Priority Data

Mar. 26, 2014 (JP) ................. 2014-063951

(51) Int. Cl.
| | | |
|---|---|---|
| H04J 14/06 | (2006.01) | |
| H04B 10/61 | (2013.01) | |
| H04B 10/077 | (2013.01) | |
| H04B 10/2507 | (2013.01) | |

(52) U.S. Cl.
CPC .......... *H04J 14/06* (2013.01); *H04B 10/0779* (2013.01); *H04B 10/2572* (2013.01); *H04B 10/614* (2013.01); *H04B 10/6162* (2013.01)

(58) Field of Classification Search
CPC .............. H04B 10/2572; H04B 10/532; H04B 10/6162; H04J 14/06
USPC ................................... 398/152, 65
See application file for complete search history.

(56) References Cited

U.S. PATENT DOCUMENTS

| | | | | | |
|---|---|---|---|---|---|
| 5,473,457 | A * | 12/1995 | Ono | ........... | H04B 10/2572 385/11 |
| 5,930,414 | A * | 7/1999 | Fishman | ........... | H04B 10/2569 385/11 |
| 6,359,714 | B1 * | 3/2002 | Imajo | ........... | H04B 10/25754 398/178 |
| 6,728,491 | B1 * | 4/2004 | Ooi | ........... | H04B 10/2507 398/147 |

(Continued)

FOREIGN PATENT DOCUMENTS

| | | |
|---|---|---|
| EP | 2690801 A1 | 1/2014 |
| JP | 2009-089194 | 4/2009 |

(Continued)

OTHER PUBLICATIONS

"Know." The Chambers Dictionary, C.M. Schwarz, Chambers Harrap, 13th edition, 2015. Credo Reference, http://search.credoreference.com/content/entry/chambdict/know/0?institutionId=743. Accessed Oct. 4, 2017.*

(Continued)

*Primary Examiner* — David Payne
*Assistant Examiner* — Tanya Motsinger
(74) *Attorney, Agent, or Firm* — Fujitsu Patent Center

(57) ABSTRACT

An optical transmitter transmits optical signal including a first signal and a second signal. The second signal is subjected to change in a polarization state relative to a polarization state of the first signal. An optical receiver analyzes a reception characteristic of the second signal and detects, based on the analyzed result, a polarization state of the first signal indicative of a higher signal quality than that of the second signal.

7 Claims, 13 Drawing Sheets

(56) References Cited

U.S. PATENT DOCUMENTS

| | | | | |
|---|---|---|---|---|
| 6,950,611 B2* | 9/2005 | Erdogan | H04B 10/2572 | 398/152 |
| 7,227,686 B1* | 6/2007 | Yan | G02B 6/2713 | 359/489.05 |
| 7,352,971 B2* | 4/2008 | Roberts | H04B 10/2569 | 356/73.1 |
| 7,869,716 B1* | 1/2011 | Boroditsky | H04B 10/2572 | 356/73.1 |
| 7,907,798 B2* | 3/2011 | Granot | H04B 10/2569 | 385/11 |
| 7,945,130 B2* | 5/2011 | Yan | G02B 6/14 | 385/1 |
| 8,045,856 B2* | 10/2011 | Shen | H04B 10/2572 | 398/147 |
| 8,073,326 B2* | 12/2011 | Yan | H04J 14/06 | 398/152 |
| 8,249,466 B2* | 8/2012 | Hoshida | H04J 14/06 | 356/73.1 |
| 8,780,433 B2* | 7/2014 | Yao | G02F 1/0136 | 359/290 |
| 8,958,702 B2* | 2/2015 | Izumi | H04B 10/2572 | 398/152 |
| 2001/0028760 A1* | 10/2001 | Yaffe | G02B 6/278 | 385/27 |
| 2002/0039217 A1* | 4/2002 | Saunders | H04B 10/25137 | 398/147 |
| 2004/0121740 A1* | 6/2004 | Miyano | H04B 7/0602 | 455/101 |
| 2004/0151416 A1* | 8/2004 | Galtarossa | H04B 10/2569 | 385/11 |
| 2005/0265728 A1* | 12/2005 | Yao | H04J 14/06 | 398/152 |
| 2007/0110451 A1* | 5/2007 | Rasmussen | H04B 10/2569 | 398/158 |
| 2008/0292321 A1* | 11/2008 | Ciaramella | H04B 10/2569 | 398/152 |
| 2009/0087194 A1* | 4/2009 | Nakashima | H04B 10/2572 | 398/158 |
| 2009/0129787 A1* | 5/2009 | Li | H04B 10/61 | 398/208 |
| 2009/0141274 A1* | 6/2009 | Szafraniec | G01M 11/337 | 356/364 |
| 2009/0196602 A1* | 8/2009 | Saunders | H04B 10/5053 | 398/26 |
| 2010/0021166 A1* | 1/2010 | Way | H04J 14/02 | 398/79 |
| 2010/0098420 A1* | 4/2010 | Ibragimov | H04B 10/0775 | 398/65 |
| 2010/0111531 A1* | 5/2010 | Tanimura | H04B 10/5055 | 398/65 |
| 2010/0189445 A1* | 7/2010 | Nakashima | H04B 10/60 | 398/152 |
| 2012/0121254 A1* | 5/2012 | Ellison | H04B 10/2569 | 398/29 |
| 2012/0224847 A1* | 9/2012 | Ibragimov | H04L 27/223 | 398/16 |
| 2013/0065547 A1* | 3/2013 | Suzuki | H04B 7/002 | 455/230 |
| 2013/0216239 A1* | 8/2013 | Zhang | H04B 10/613 | 398/202 |
| 2014/0003824 A1* | 1/2014 | Sun | H04B 10/25073 | 398/202 |
| 2014/0079390 A1* | 3/2014 | Kim | H04B 10/0773 | 398/30 |
| 2014/0133865 A1* | 5/2014 | Reimer | H04B 10/532 | 398/152 |
| 2014/0341587 A1* | 11/2014 | Nakashima | H04B 10/2572 | 398/115 |
| 2015/0117857 A1* | 4/2015 | Vassilieva | H04Q 11/0067 | 398/33 |
| 2015/0131987 A1* | 5/2015 | Yang | H04B 10/077 | 398/16 |
| 2015/0155934 A1* | 6/2015 | Nakagawa | H04B 10/0775 | 398/34 |
| 2015/0195045 A1* | 7/2015 | Zhuge | H04B 10/532 | 398/184 |
| 2015/0280856 A1* | 10/2015 | Nakashima | H04B 10/614 | 398/65 |
| 2016/0065326 A1* | 3/2016 | Kisaka | H04L 27/2096 | 398/65 |
| 2017/0026114 A1* | 1/2017 | Sugitani | H04B 10/07953 | |
| 2017/0338882 A1* | 11/2017 | Sasame | H04B 7/0456 | |
| 2018/0091225 A1* | 3/2018 | Wang | H04B 10/5161 | |

FOREIGN PATENT DOCUMENTS

| | | |
|---|---|---|
| JP | 2009-133840 | 6/2009 |
| JP | 2010-109705 | 5/2010 |
| JP | 2010-226499 | 10/2010 |
| WO | 2013/114629 A1 | 8/2013 |

OTHER PUBLICATIONS

EESR—Extended European Search Report dated Jul. 29, 2015 for corresponding European Patent Application No. 15159911.5.
EPOA—European Office Action dated Mar. 14, 2017 for corresponding European Patent Application No. 15159911.5.
JPOA—Office Action of Japanese Patent Application No. 2014-063951 dated Nov. 21, 2017, with relevant machine translation of the office action.
EPOA—Office Action of European Patent Application No. 15 159 911.5 dated Mar. 16, 2018.

* cited by examiner

POLARIZATION STATE DETECTOR, OPTICAL TRANSMITTER, AND OPTICAL RECEIVER

CROSS-REFERENCE TO RELATED APPLICATION

This application is based upon and claims the benefit of priority of the prior Japanese Patent Application No. 2014-063951, filed on Mar. 26, 2014, the entire contents of which are incorporated herein by reference.

FIELD

The embodiment discussed herein is related to a polarization state detector, a method of detecting a polarization state, an optical communication system, an optical transmitter, and an optical receiver.

BACKGROUND

As examples of technology to realize high-speed and high-capacity optical transmission, a polarization multiplexing technology and a multi-value modulation technology are known. For example, the polarization multiplexing technology transmits signals assigned or mapped to two orthogonal polarized waves. Meanwhile, the multi-value modulation technology modulates light to be transmitted by using a modulation scheme available to transmit information of multiple bits in one symbol time. The modulation scheme may be a phase-shift keying including QPSK or a quadrature amplitude modulation of $2^M$-QAM (where, M represents the number of multi-levels and is an integer of two or more).

In addition, a digital coherent reception technology using digital signal processing may be applied to a reception side of an optical signal. In the digital coherent reception technology, a received signal light is mixed with a local oscillation light of a local oscillator source by 90 degrees optical hybrid. Thereby, information indicative of the amplitude and the phase of the optical signal with reference to the local oscillator light is extracted. The extracted information (signal) is digitalized by an analog-to-digital converter (ADC), and the digital signal is demodulated by using a digital signal processing. The digital signal processing is possible to compensate a waveform distortion (in other words, degradation of a signal quality) of received signal light due to wavelength dispersion, polarization mode dispersion, and the like of the optical transmission line.

In contrast, since a polarization state of a transmitted optical signal varies with time, it is difficult to compensate for degradation of the signal quality due to a polarization dependence loss (PDL), which occurs in an optical transmission line, an optical repeater, or the like, by using digital signal processing on the reception side. For this reason, the PDL is a major factor that limits the transmission capability of an optical signal.

In order to absorb the degradation of the signal quality due to the PDL, a scheme to average the polarization states of a transmitted optical signal (or a scheme corresponding to an averaging process) has been proposed (for example, see JP 2009-89194 A and JP 2010-109705 A).

JP 2009-89194 A discloses that data to be transmitted with two orthogonal polarizations are interleaved. Thus, according to JP 2009-89194 A, even if the PDL is present in an optical transmission line, an optical repeater, or the like, it is possible to average bit error rates (BERs) between the polarizations.

Meanwhile, JP 2010-109705 A discloses a high-speed polarization scrambling process achieved by a polarization scrambling process with digital signal processing. Thus, according to JP 2010-109705 A, similar to JP 2009-89194 A, even if the PDL is present in an optical transmission line, an optical repeater, or the like, it is also possible to average the BERs between the polarizations.

As examples of technology to monitor the PDL, technologies disclosed in JP 2009-133840 A and JP 2010-226499 A are known.

However, according to the technologies to average the polarization states of a transmitted optical signal by using a scrambling process, as disclosed in JP 2009-89194 A and JP 2010-109705 A, a maximum penalty due to the PDL of the transmitted optical signal may be absorbed but the averaging process merely achieves a small improvement in the BERs. Meanwhile, in order to further improve in the BER, the varying of the polarizations may be speeded-up on the transmission side in the technology disclosed in JP 2010-109705 A. However, the reception side may be unavailable to follow (or track) a change in the polarizations. Hence, the influence for the optical signal on the reception characteristic is large.

Both of JP 2009-133840 A and JP 2010-226499 A merely disclose technologies to measure (or monitor) the PDL of an optical transmission line.

SUMMARY

One aspect of a polarization state detector may include an analyzer and a detector. The analyzer receives an optical signal including a first signal and a second signal from an optical transmitter. The second signal is subjected to change in a polarization state relative to a polarization state of the first signal. Further, the analyzer analyzes a reception characteristic of the second signal. The detector detects, based on the analyzed result of the analyzer, a polarization state of the first signal indicative of a higher signal quality than that of the second signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
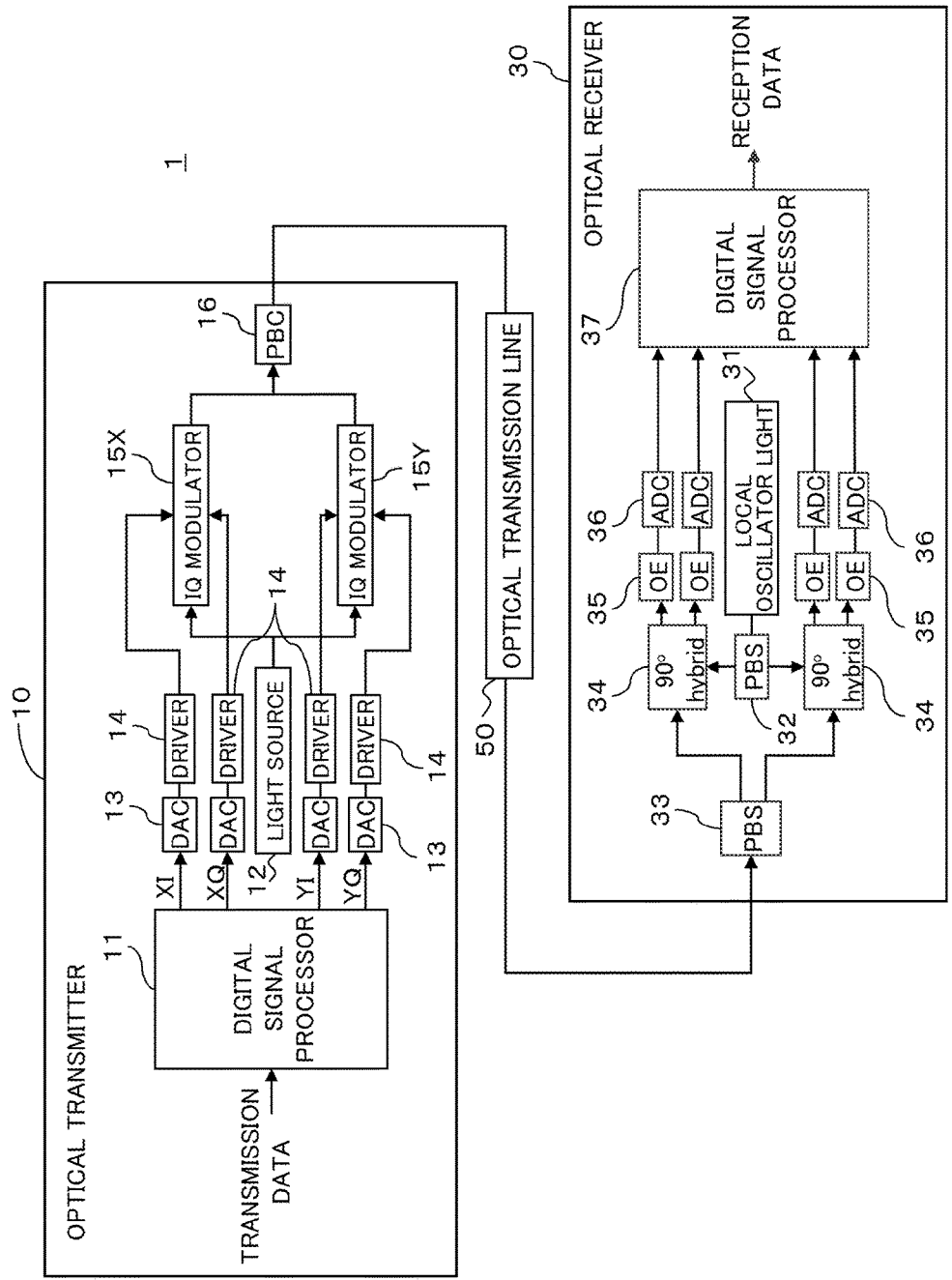
FIG. 1 is a block diagram that illustrates an exemplary configuration of an optical communication system according to an embodiment.

Hereinafter, an embodiment will be described with reference to the drawings. However, the embodiment described below is merely an example but is not intended to exclude various modifications or technical applications unless otherwise specified in the following embodiment. In the drawings used in the following embodiment, the same reference numerals used in the embodiment denote the same elements unless otherwise mentioned.

(Embodiment)

FIG. 1 is a block diagram that illustrates an exemplary configuration of an optical communication system 1 according to an embodiment. The optical communication system 1 illustrated in FIG. 1 is an example of an optical communication system with a digital coherent transmission technology. The optical communication system includes, for example, an optical transmitter 10 that transmits an optical signal to an optical transmission line 50, and an optical receiver 30 that receives the optical signal transmitted through the optical transmission line 50. An optical fiber is applicable to the optical transmission line 50. In addition, the optical transmission line 50 may be provided with one or more of optical repeaters including an optical amplifier according to a transmission distance of an optical signal.

Although FIG. 1 illustrates an exemplary configuration of the optical communication system 1 with focusing on unidirectional optical transmission, the optical communication system 1 may be configured to perform bidirectional optical communication. For example, a first optical transmission apparatus provided with the optical transmitter 10 may be connected to a second optical transmission apparatus that is opposed to the first optical transmission apparatus and is provided with the optical receiver 30 through a bidirectional optical transmission line 50.

In such a case, the first optical transmission apparatus may include an optical receiver with a configuration equivalent to that of the optical receiver 30 in the second optical transmission apparatus as an example of a reception system. Meanwhile, the second optical transmission apparatus may include an optical transmitter with a configuration equivalent to that of the optical transmitter 10 in the first optical transmission apparatus.

(Optical Transmitter)

The optical transmitter 10 includes, for example, a digital signal processor (DSP) 11, a light source 12, four of digital-to-analog converters (DACs) 13, four of drivers 14, two of IQ modulators 15X and 15Y, and a polarization beam combiner (PBC) 16.

The digital signal processor 11 performs digital signal processing on a transmission data signal that is an electrical signal. The digital signal processor 11 may be achieved by using, for example, a field programmable gate array (FPGA), a large-scale integration circuit (LSI), or the like.

The digital signal processing may include polarization control for two orthogonal polarizations X and Y and a digital modulation process according to a modulation scheme such as phase-shift keying (PSK) or quadrature amplitude modulation (QAM).

The digital modulation process is possible to generate, for example, data XI and YI to be mapped to the two orthogonal polarizations X and Y, respectively, as a in-phase component (I component) and to generate data XQ and YQ to be mapped to the two orthogonal polarizations X and Y, respectively, as a quadrature components (Q).

In other words, the data XI and XQ respectively represent I-component data and Q-component data to be mapped to one polarization X, and the data YI and YQ respectively represent I-component data and Q-component data to be mapped to the other polarization Y.

The light source 12 generates light (for example, continuous light) for transmission and inputs the generated light to the IQ modulators 15X and 15Y.

The DACs 13 respectively convert the data XI, XQ, YI, and YQ input from the digital signal processor 11 from digital signals into analog signals and inputs the converted analog signals to corresponding drivers 14. Among the four DACs 13, two DACs 13 correspond to the polarization X, and the other two DACs 13 correspond to the polarization Y.

One of the two DACs 13 corresponding to the polarization X converts the I-component data XI to be mapped to the polarization X into an analog signal, and the other DAC 13 thereof converts the Q-component data XQ to be mapped to the polarization X into an analog signal. Meanwhile, one of the two DACs 13 corresponding to the polarization Y converts the I-component data YI to be mapped to the polarization Y into an analog signal, and the other DAC 13 thereof converts the Q-component data YQ to be mapped to the polarization Y into an analog signal.

The drivers 14 generate drive signals for the IQ modulators 15X and 15Y. For example, among the four drivers 14, two drivers 14 correspond to the polarization X, and the other two drivers 14 correspond to the polarization Y.

One of the two drivers 14 corresponding to the polarization X generates a drive signal according to the I-component data XI converted into the analog signal for the IQ modulator 15X corresponding to the polarization X. Meanwhile, the other of the two drivers 14 corresponding to the polarization X generates a drive signal according to the Q-component data XQ converted into the analog signal for the IQ modulator 15X corresponding to the polarization X.

One of the two drivers 14 corresponding to the polarization Y generates a drive signal according to the I-component data YI converted into the analog signal for the IQ modulator 15Y corresponding to the polarization Y. Meanwhile, the other of the two drivers 14 corresponding to the polarization Y generates a drive signal according to the Q-component data YQ converted into the analog signal for the IQ modulator 15Y corresponding to the polarization Y.

Here, the drive signal generated according to the I-component data XI corresponding to the polarization X may be simply referred to as a "drive signal XI", and the drive signal generated according to the Q-component data XQ corresponding to the polarization X may be simply referred to as a "drive signal XQ". Similarly, the drive signals respectively generated according to the I-component data YI and the Q-component data YQ corresponding to the polarization Y may be simply referred to as a "drive signal YI" and a "drive signal YQ".

Each of the IQ modulators 15X and 15Y may be an optical modulator such as a Mach-Zehnder optical modulator and modulates the continuous light input from the light source 12 with the drive signals input from two of the drivers 14 to generate transmission modulation signal light of the polarization X or transmission modulation signal light of the polarization Y.

For example, the IQ modulator 15X corresponding to the polarization X modulates the continuous light input from the light source 12 with the drive signals XI and XQ input from two of the drivers 14 to generate the transmission modulation signal light of the polarization X.

Meanwhile, the IQ modulator 15Y corresponding to the polarization Y modulates the continuous light input from the light source 12 with the drive signals YI and YQ input from two of drivers 14 to generate the transmission modulation signal light of the polarization Y.

The PBC 16 combines (or multiplexes) the transmission modulation signal light of the polarization X generated by one IQ modulator 15X and the transmission modulation signal light of the polarization Y generated by the other IQ modulator 15Y. Transmission modulation signal light (it may be referred to as "polarization multiplexed signal light") generated by the PBC 16 is transmitted to the optical transmission line 50.

Here, the light source 12, the driver 14, the IQ modulators 15X and 15Y, and the PBC 16 described above may be considered as an example of an optical modulator that modulates transmission light input from the light source 12 with transmission data and a detection-oriented signal described later.

(Optical Receiver)

Meanwhile, the optical receiver 30 illustrated in FIG. 1 is an optical receiver available to perform digital coherent reception. Thus, the optical receiver 30 includes, for example, a local oscillator light source 31, a polarization beam splitters (PBSs) 32 and 33, and two of 90-degrees hybrids 34. These elements may form an example of a coherent optical detector. Further, the optical receiver 30 may include four of optic-to-electric converters (OE) 35, four of analog-to-digital converters (ADCs) 36, and a digital signal processor (DSP) 37.

The local oscillator light source 31 is an example of a light source that outputs local oscillator light used for detecting light in each of the 90-degrees hybrids 34. A laser light source such as a distributed feedback (DFB) laser is applicable to the local oscillator light source 31.

The PBS 32 splits the local oscillator light input from the local oscillator light source 31 into two orthogonal polarization components. One polarization component is input to one of the 90-degrees hybrids 34 and the other polarization component is input to the other of the 90-degrees hybrids 34.

The PBS 33 splits polarization multiplexed signal light, which is transmitted by the optical transmitter 10 and is received through the optical transmission line 50, into two orthogonal polarization components. The two polarization components are respectively input to the 90-degrees hybrids 34 to which the local oscillator light of the corresponding polarization components is input.

Each of the 90-degrees hybrids 34 detects polarization component input from the PBS 33 with the local oscillator light input from the PBS 32 to output detection light of the I component and detection light of the Q component as a result of the detection.

For example, one of the 90-degrees hybrids 34 detects signal light received from the optical transmission line 50 with local oscillator light of an orthogonal component of the polarization X (hereinafter, also referred to as an "X polarization component") to output detection light of the I component and the Q component.

Similarly, the other of the 90-degrees hybrids 34 detects signal light received from the optical transmission line 50 with a component of the other polarization Y (hereinafter, also referred to as a "Y polarization component") to output detection light of the I component and the Q component.

Each of the four optic-to-electric converter 35 converts the detection light input from the 90-degrees hybrid 34 into an electrical signal. For example, among the four optic-to-electric converters 35, two of the optic-to-electric converters 35 correspond to the X polarization component, and the other two optic-to-electric converters 35 correspond to the Y polarization component.

The two of the optic-to-electric converters 35 corresponding to the X polarization component respectively converts the I component and the Q component of the detection light corresponding to the X polarization component into electrical signals. Meanwhile, the two of the optic-to-electric converters 35 corresponding to the Y polarization component respectively converts the I component and the Q component of the detection light corresponding to the Y polarization component into electrical signals.

Each of the ADCs 36 converts an analog electrical signal input from the corresponding optic-to-electric converter 35 into a digital signal. An AC coupling element such as a capacitor may be provided between the optic-to-electric converter 35 and the ADC 36.

The digital signal processor 37 performs digital signal processing on digital signals of the I component and the Q component, which are input from the ADCs 36 and are detection results of the X polarization component and the Y polarization component.

For example, the digital signal processor 37 splits transmission data modulated and transmitted for each of the polarizations X and Y by the IQ modulators 15X and 15Y in the optical transmitter 10 by using input digital signals to regenerate (or demodulate) data transmitted by the optical transmitter 10 as reception data. The digital signal processor 37 may be achieved by using an FPGA, an LSI, or the like.

(PDL Loss)

Next, with reference to FIGS. 2 and 3, the influence of a polarization dependence loss (PDL) on the polarization multiplexed signal light transmitted in the optical communication system 1 as illustrated is FIG. 1 will be described.

In a case where polarization multiplexed signal light is transmitted through a medium with a PDL (hereinafter, it may be referred to as a "PDL medium") such as the optical transmission line 50, an optical amplifier, or the like, a difference in power between polarization components of the signal light may be occurred depending on a polarization state at the time when the signal light is input to the PDL medium.

Figure 2A:
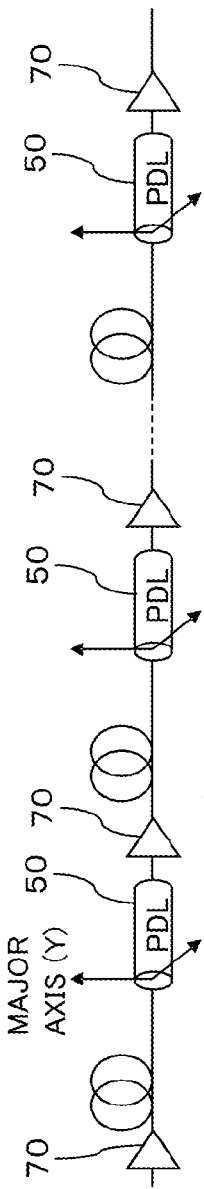
FIGS. 2A to 2C are diagrams that illustrate an influence of PDL on a polarization-division-multiplexed signal light transmitted in the optical communication system illustrated in FIG. 1.

For example, as schematically illustrated in FIG. 2A, it is assumed that polarization multiplexed signal light is transmitted between the optical transmitter 10 and the optical receiver 30 through a PDL medium such as the optical transmission line 50 or the optical amplifier 70 over a plurality of stages (or spans).

Figure 2B:
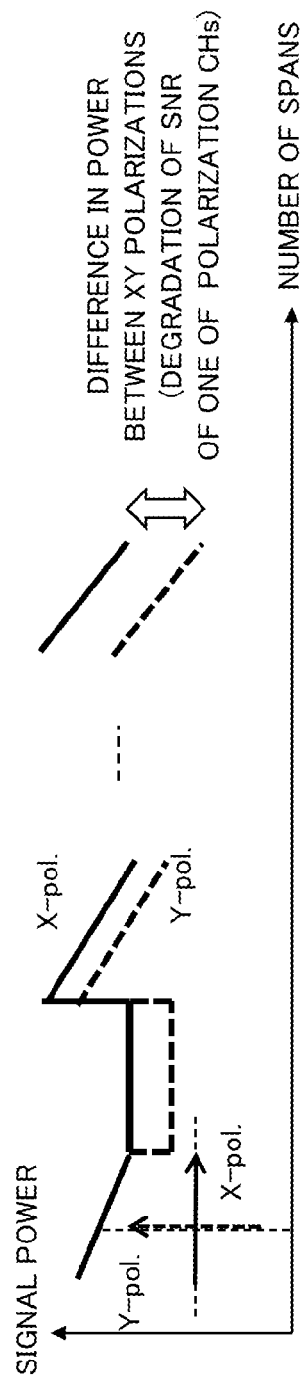

In such a case, for example, as schematically illustrated in FIG. 2B, when polarization multiplexed signal light is input to the PDL medium in a state where two orthogonal polarization principle axes of the PDL medium coincide with the axes of the polarization components of the polarization multiplexed signal light, a power difference between the polarization components of the signal light is occurred. FIG. 2B exemplarily illustrates that the power of the Y polarization component of the signal light is degraded more than that of the X polarization component. However, the relative degradation relation between the components may be reversed. The polarization principle axes of the PDL medium may be considered as axes at which a difference between losses of the polarizations of the PDL medium becomes the maximum.

Figure 2C:
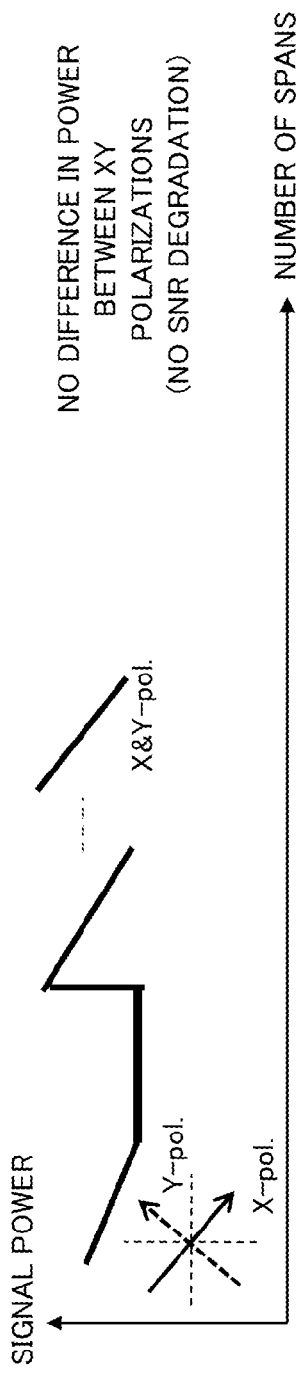

On the other hand, as schematically illustrated in FIG. 2C, in a case where polarization multiplexed signal light is input to the PDL medium in a state where the axes of the polarization components of the polarization multiplexed signal light is deviated from the polarization principle axes of the PDL medium by 45 degrees, a difference in power between the polarization components becomes the minimum.

Figure 3:
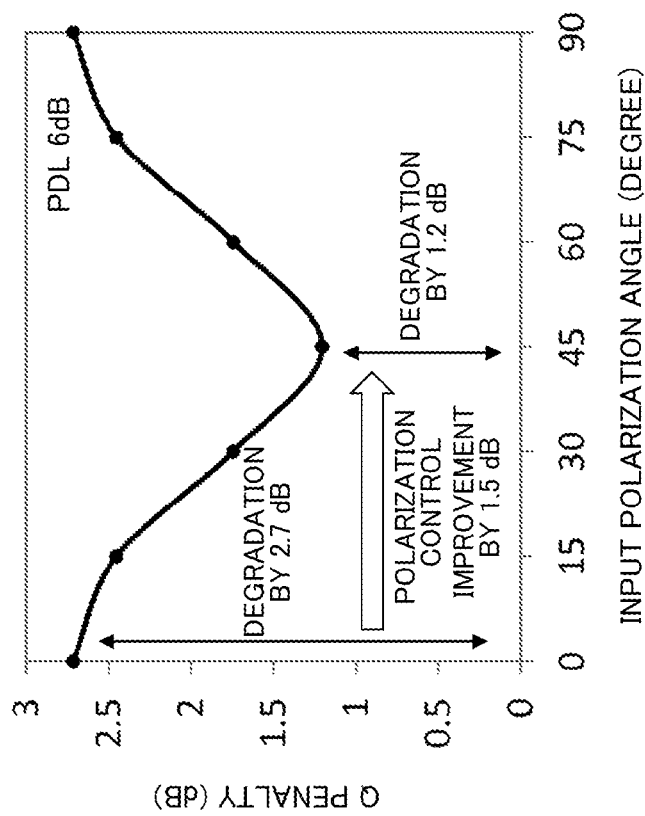
FIG. 3 is a diagram that illustrates an example of a change in a Q penalty with respect to an input polarization state (angle) for a PDL medium.

FIG. 3 is a diagram that illustrates an example of a change in a Q penalty with respect to an input polarization state (angle) for the PDL medium. FIG. 3 illustrates an example of a change in the degradation (Q penalty) of the signal quality (Q value) of a case where a total PDL of a plurality of PDL media through which transmitted polarization multiplexed signal light passes is assumed to be 6 dB.

As illustrated in FIG. 3, when the principle axes of the PDL medium coincide with the axes of the polarization components of the polarization multiplexed signal light, in other words, in a case where the deviation angle of the input polarization wave with respect to the principle axes illustrated in FIG. 2B is zero, the Q penalty is degraded by about 2.7 dB. Here, the deviation angle of the input polarization wave with respect to the principle axes of the PDL medium may be referred to as an "input polarization angle". As the input polarization angle increases from zero degree, the Q penalty decreases, and the Q penalty becomes the minimum (for example, a degradation of 1.2 dB) when the deviation angle is 45 degrees. In other words, by controlling the polarization state of the polarization multiplexed signal light to change the input polarization angle from zero degree to 45 degrees, the Q penalty can be improved by about 1.5 dB.

As described above, depending on the input polarization state of the polarization multiplexed signal light for the PDL medium, in other words, depending on the polarization state of the transmission signal light, a difference between the transmission characteristic (for example, a penalty) of signal light between the polarization components (hereinafter, may also be referred to as "polarization channels") may be occurred.

Such transmission characteristic difference is also discussed in O. Vassilieva et. al, "Impact of Polarization Dependent Loss and Cross-Phase Modulation on Polarization Multiplexed DQPSK Signals", OFC/NFOEC 2008, paper OThU6, 2008, for example.

When a difference in power between the polarization channels is occurred, a difference in signal quality (for example, signal-to-noise ratios (SNR)) between the polarization channels may also occurs. Accordingly, the reception signal quality in the optical receiver 30 may be degraded markedly because the signal quality of one polarization component does not satisfy a required quality.

Thus, in the present embodiment, the optical receiver 30 detects (or monitors) the transmission polarization state of the optical transmitter 10, which has a relatively small signal quality degradation caused by the PDL, and the optical transmitter 10 is controlled such that the polarization multiplexed signal is transmitted in the detected transmission polarization state. Thereby, it is possible to suppress the degradation of the signal quality of the polarization multiplexed signal due to the PDL.

(Exemplary Format of Transmission Signal)

In order to detect the transmission polarization state of the optical transmitter 10, the digital signal processor 11 (hereinafter, it may be referred to as a "transmission signal processor 11") of the optical transmitter 10 may transmit (or insert) a detection-oriented signal between (or into) transmission data. The detection-oriented signal may be periodically transmitted for the transmission data. With the periodical transmission of the detection-oriented signal, it is possible to improve the reliability of the detection of the transmission polarization state.

Here, the transmission data may be referred to either the "main signal data" or the "payload data". In addition, the detection-oriented signal may be referred to either the "monitor signal" or the "monitor data". The transmission data is an example of a first signal, and the detection-oriented signal is an example of a second signal.

The detection-oriented signal may be set as a known signal between the optical transmitter 10 and the optical receiver 30. By setting the detection-oriented signal as the known signal, it is possible to improve the detection accuracy of the transmission polarization state of the optical transmitter 10 in the optical receiver 30.

Figure 4:
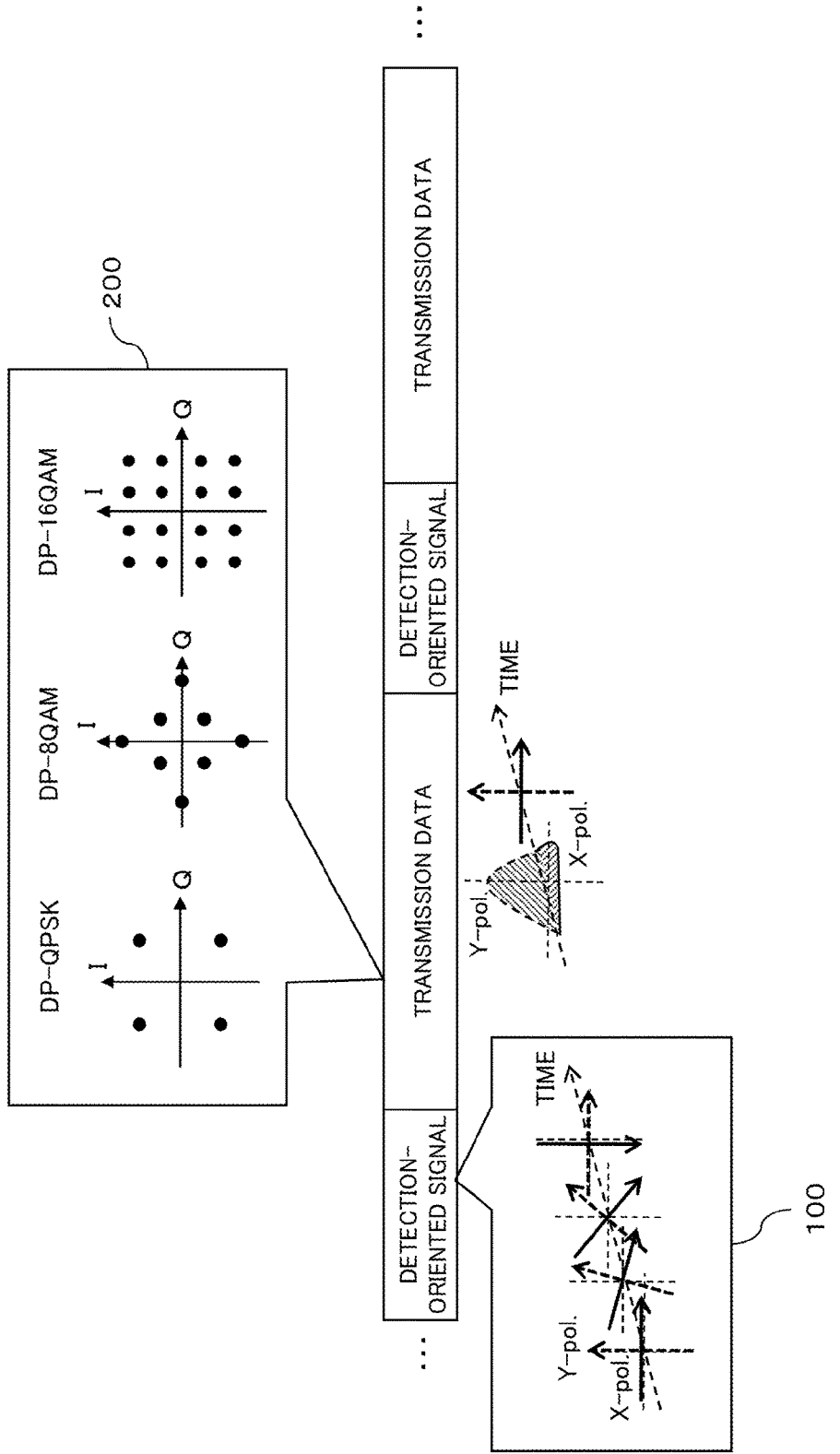
FIG. 4 is a diagram that illustrates an example of a transmission signal format used in the optical communication system illustrated in FIG. 1.

For example, the detection-oriented signal may be a signal of which the polarization state is changed (or controlled) in time with respect to the polarization state of the transmission data. As a non-limited example, the detection-oriented signal may be a polarization multiplexed signal similar to the transmission data but, as illustrated in a frame 100 illustrated in FIG. 4, may be a signal acquired by rotating two orthogonal polarization components of the detection-oriented signal around a center corresponding to an intersection of axes of the two orthogonal polarization components of the transmission data by mutually-different angles at different time with respect to the transmission data.

In the optical receiver 30, the digital signal processor 37 a reception characteristic (may be referred to as a signal quality) of the detection-oriented signal of which the polarization state is changed in time as described above for each polarization state. Then, the optical receiver 30 detects, based on the analyzed result, a transmission polarization state of the optical transmitter 10 indicative of a relatively high signal quality of the transmission data. In other words, the polarization state indicative of a relatively high signal quality of the transmission data corresponds to a polarization state indicative of a relatively low signal quality degradation due to a PDL of the transmission data.

For example, the digital signal processor 37 may detect a polarization state indicative of the highest signal quality among from the reception characteristics of the detection-oriented signal in time-varied polarization states as an optimal transmission polarization state for the optical transmitter 10. The optical receiver 30 transmits (or feeds back)

information indicative of the optimal transmission polarization state detected by the digital signal processor 37 (hereinafter, it may be referred to as a "reception signal processor 37") to the optical transmitter 10.

The transmission signal processor 11 of the optical transmitter 10 is operable to control the polarization state of the transmission data to be the optimal transmission polarization state detected by the optical receiver 30 based on the information fed back from the optical receiver 30. Thereby, it is possible to suppress the degradation of the signal quality of the polarization multiplexed signal due to the PDL.

The modulation schemes of the detection-oriented signal and the transmission data are not limited to particular schemes. For example, as a non-limited example, a phase shift keying scheme such as BPSK or QPSK, a quadrature amplitude modulation scheme called $2^M$-QAM (here, M represents the number of multi-levels, and M=3, 4, 5, 6, or the like), or the like is applicable to the modulation scheme of the detection-oriented signal. In addition, as illustrated in a frame 200 represented in FIG. 4, a polarization multiplexing modulation scheme such as dual polarization (DP)-QPSK, DP-8QAM, or DP-16QAM is applicable to the modulation scheme of the transmission data. The detection-oriented signal may be modulated by using the polarization multiplexing modulation scheme or may be a signal with a single polarization (SP).

The detection-oriented signal may be inserted as analog data into a signal acquired by mapping the transmission data to a symbol (electric field information) of a complex plane (IQ plane) which may also be referred to as a constellation. An example thereof is illustrated in FIGS. 5 and 6.

Figure 5:
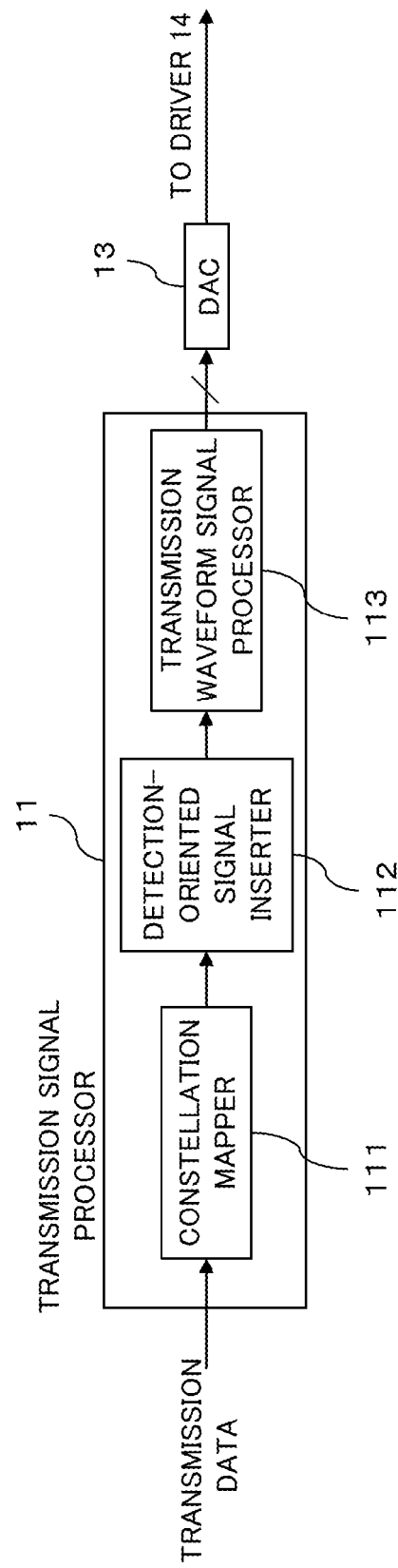
FIG. 5 is a block diagram that illustrates an exemplary configuration of a digital signal processor (transmission signal processor) of an optical transmitter illustrated in FIG. 1.
Figure 6:
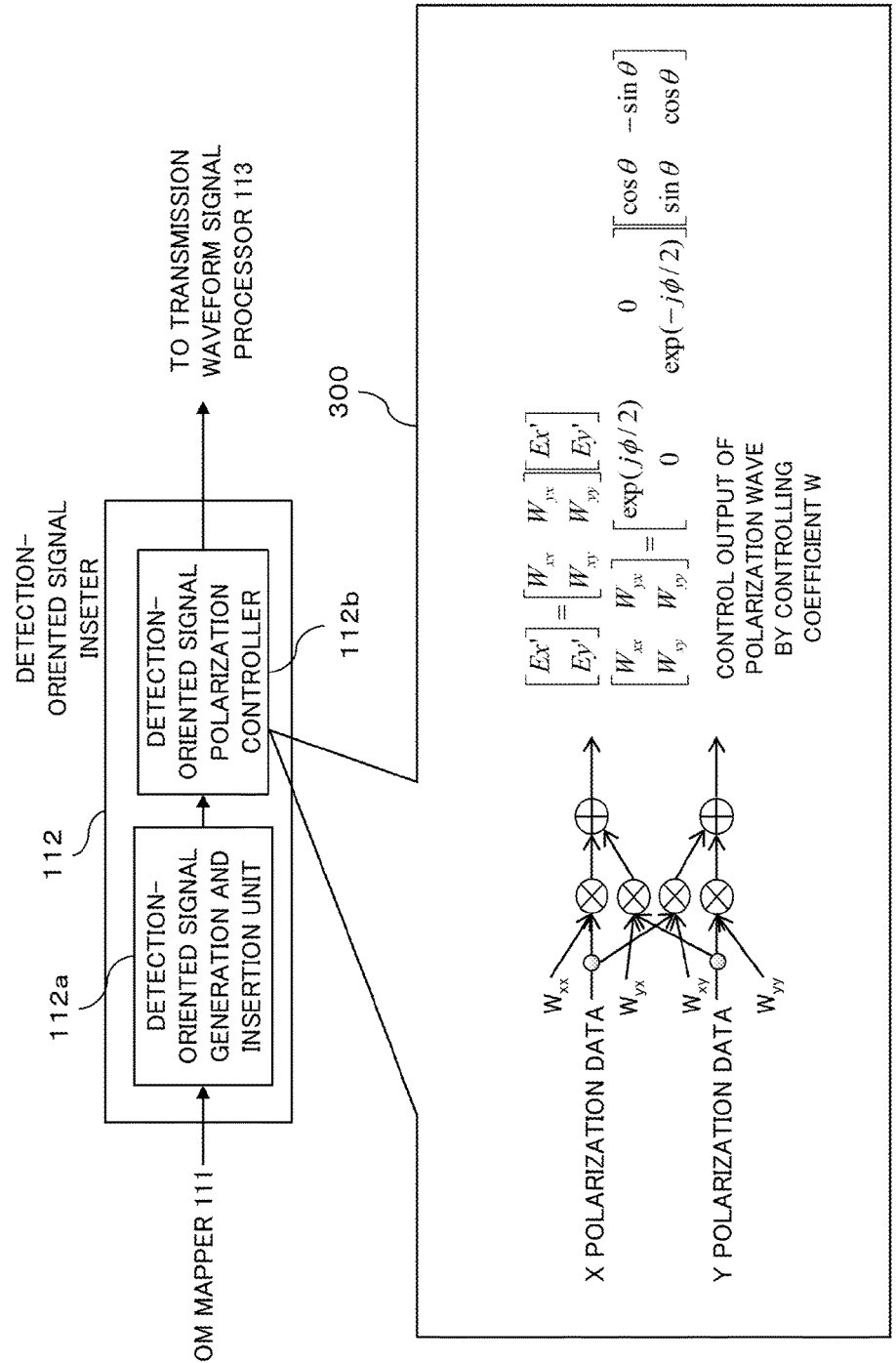
FIG. 6 is a block diagram that illustrates an exemplary configuration of a detection-oriented signal inserter illustrated in FIG. 5.

FIG. 5 is a block diagram that illustrates an exemplary configuration of the transmission signal processor 11, and FIG. 6 is a block diagram that illustrates an exemplary configuration of a detection-oriented signal inserter 112 illustrated in FIG. 5.

The transmission signal processor 11 illustrated in FIG. 5 includes, for example, a constellation mapper (hereinafter, it may be referred to as a "mapper") 111, a detection-oriented signal inserter 112, and a transmission waveform signal processor 113.

In the exemplary configuration illustrated in FIG. 5, the constellation mapper 111 maps the transmission data to a symbol on the IQ plane according to the modulation scheme.

The detection-oriented signal inserter 112 inserts the detection-oriented signal of analog data into the transmission data that is mapped to the symbol on the IQ plane.

The transmission waveform signal processor 113 performs, for example, a spectrum shaping process such as a Nyquist waveform shaping process, a skew compensating process, a band compensating process, and the like on the transmission data into which the detection-oriented signal is inserted by the detection-oriented signal inserter 112.

As illustrated in FIG. 6, the detection-oriented signal inserter 112 includes, for example, a detection-oriented signal generation and insertion unit 112a, and a detection-oriented signal polarization controller 112b.

The detection-oriented signal generation and insertion unit 112a generates a detection-oriented signal and inserts the detection-oriented signal into the output of the mapper 111.

The detection-oriented signal polarization controller 112b controls the polarization state of the detection-oriented signal inserted by the detection-oriented signal generation and insertion unit 112a for each polarization component, thereby changing the polarization state of the detection-oriented signal in time. As a non-limited example, the detection-oriented signal polarization controller 112b may control coefficients Wxx, Wxy, Wyx, and Wyy represented by the following Formulas (1) and (2), thereby controlling the polarization state of the detection-oriented signal.

[Formula 1]
$$\begin{bmatrix} Ex' \\ Ey' \end{bmatrix} = \begin{bmatrix} W_{xx} & W_{yx} \\ W_{xy} & W_{yy} \end{bmatrix} \begin{bmatrix} Ex' \\ Ey' \end{bmatrix} \quad (1)$$

[Formula 2]
$$\begin{bmatrix} W_{xx} & W_{yx} \\ W_{xy} & W_{yy} \end{bmatrix} = \begin{bmatrix} \exp(j\phi/2) & 0 \\ 0 & \exp(-j\phi/2) \end{bmatrix} \begin{bmatrix} \cos\theta & -\sin\theta \\ \sin\theta & \cos\theta \end{bmatrix} \quad (2)$$

The calculation represented by Formulas (1) and (2) above may be achieved by using four multipliers and two adders, as illustrated by a frame 300 represented in FIG. 6. Ex' and Ey' in Formula 1 respectively represent data (or electric field information) indicative of electric fields of the X polarization component and the Y polarization component of the output signal of the detection-oriented signal generation and insertion unit 112a and also represent, for example, electric field information of the detection-oriented signal having the same polarization axes as the transmission data serving as the reference. Meanwhile, θ and φ in Formula (2) represent parameters used to control the polarization state of the detection-oriented signal. Accordingly, the coefficients Wxx, Wxy, Wyx, and Wyy can be controlled by controlling θ and φ.

In the above example, although the polarization state of the detection-oriented signal is controlled by using Formulas (1) and (2), the polarization state may be controlled by not depending on calculation equations. For example, the polarization state control may be achieved by time-divisionally selecting (or switching) a pattern among a plurality of patterns having mutually-different polarization states which are stored in advance as the detection-oriented signal in a storage unit (not illustrated in the figure) such as a memory provided in the transmission signal processor 11.

(Reception Signal Processor)

Figure 7:
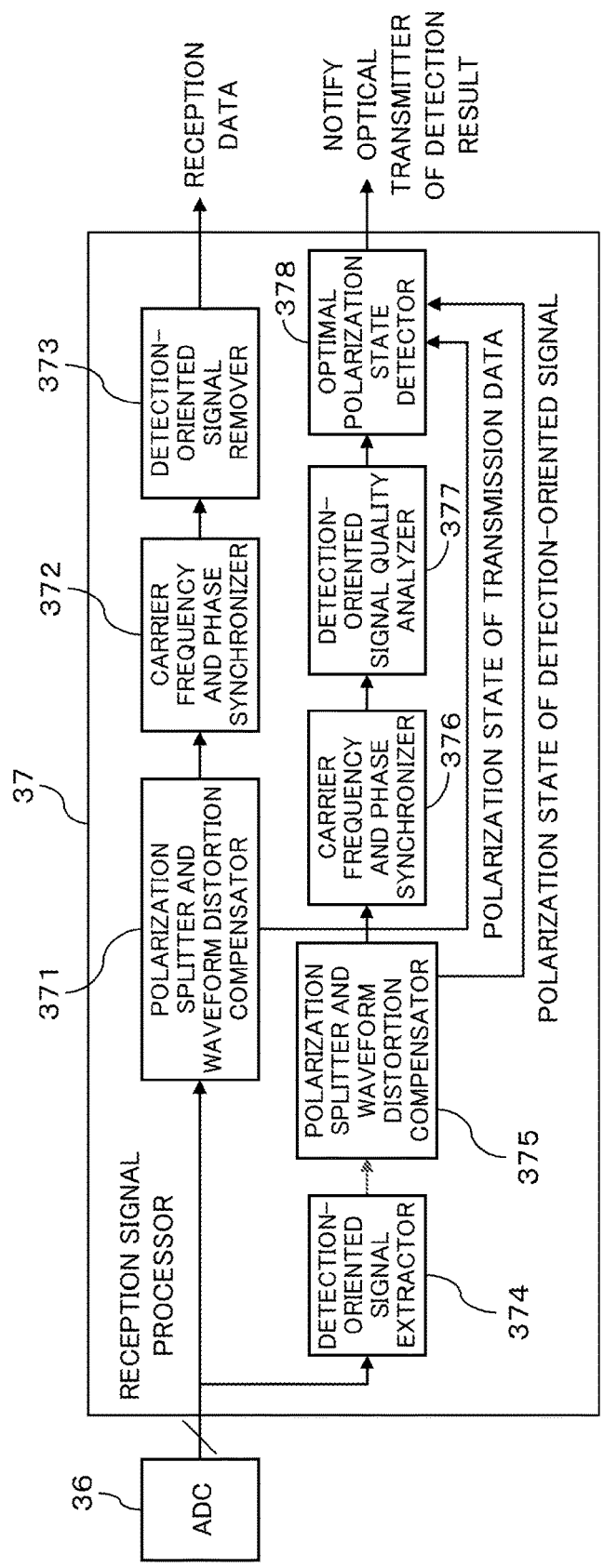
FIG. 7 is a block diagram that illustrates an exemplary configuration of a digital signal processor (reception signal processor) of an optical receiver illustrated in FIG. 1.

FIG. 7 illustrates an exemplary configuration focusing on the reception signal processor (digital signal processor) 37 of the optical receiver 30 illustrated in FIG. 1. The reception signal processor 37 illustrated in FIG. 7 includes, for example, a polarization splitter and waveform distortion compensator 371, a carrier frequency and phase synchronizer 372, and a detection-oriented signal remover 373. Such units (or circuits) 371 to 373 serves as an example of a reception data regenerator that regenerates reception data.

In addition, the reception signal processor 37 includes, for example, a detection-oriented signal extractor 374, a polarization splitter and waveform distortion compensator 375, a carrier frequency and phase synchronizer 376, a detection-oriented signal quality analyzer 377, and an optimal polarization state detector 378. Such units (or circuits) 374 to 378 serves as an example of a polarization state monitor that detects (or monitors) an optimal transmission polarization state of the optical transmitter 10 based on the reception characteristic of the detection-oriented signal that is inserted into the transmission data as described above in the optical transmitter 10. The "polarization state monitor" may also be referred to as a "polarization state detector".

The polarization splitter and waveform distortion compensator 371 splits a reception digital signal input from the ADC 36 for each polarization component and compensates for the waveform distortion of each polarization component, for example. The compensation is, for example, compensation (or adaptive equalization) for a waveform distortion due to polarization mode dispersion (PMD). The adaptive equalization may be achieved by using a plurality of linear filters. For example, by adaptively updating parameters of the linear filters at a speed sufficiently higher than that of a polarization variation of signal light inside an optical fiber, it is possible to compensate for a polarization variation or a PMD waveform distortion accompanying a high-speed change in time.

The carrier frequency and phase synchronizer 372 removes (or cancels) a noise component from the reception digital signal of which the waveform distortion is compensated for each polarization component by the polarization splitter and waveform distortion compensator 371. Further, the synchronizer 372 estimates a correct carrier phase and synchronizes the phase of the reception digital signal with the estimated correct carrier phase. The noise component may include, for example, a natural spontaneous emission (ASE) noise, a laser phase noise of the light source 12 used for the optical transmitter 10, and the like. A feed-back method, a feed-forward method, or the like is applicable to the estimation of a carrier phase, for example. The feed-back method is possible to eliminate the influence of noises by using a digital loop filter. The feed-forward method is possible to eliminate the influence of noises by averaging estimated phase differences detected by a phase detector.

Between the compensator 371 and the synchronizer 372, one or a plurality of other processors may be provided. As an example of the other processor may be a frequency offset compensator.

The frequency offset compensator compensates (or corrects) for a frequency offset between signal light received from the optical transmission line 50 and local oscillator light output by the local oscillator light source 31 (see FIG. 1). The estimation of the frequency offset may be performed by using, for example, an estimation method called as a m-th square method, an estimation method called as a pre-decision based angle differential frequency offset estimator (PADE) method. The PADE method is possible to increase an estimation range of the frequency offset to be larger than that of the exponentiation method.

The detection-oriented signal remover 373 removes (or cancels) a signal component corresponding to the detection-oriented signal from each polarization component synchronized with the carrier phase and outputs reception data.

A non-linear distortion compensator that compensates for a non-linear distortion of the reception digital signal may be arranged on the front stage or the rear stage of the detection-oriented signal remover 373.

The detection-oriented signal extractor 374 extracts a detection-oriented signal that is included in the reception digital signal input from the ADC 36.

The polarization splitter and waveform distortion compensator 375, similar to the polarization splitter and waveform distortion compensator 371, performs splitting of polarization components and a waveform distortion compensation for each polarization component of the detection-oriented signal extracted by the detection-oriented signal extractor 374. Hereinafter, the polarization splitter and waveform distortion compensators 371 and 375 may be simply abbreviated respectively as the "compensators 371 and 375".

The synchronizer 376, similar to the synchronizer 372, performs the process of removal of a noise component, estimation of a carrier phase, carrier phase synchronization, and the like on the detection-oriented signal for which the waveform distortion compensation of each polarization component has been performed by the compensator 375.

The detection-oriented signal quality analyzer 377 analyzes the quality of the detection-oriented signal synchronized with the carrier phase. For example, the analysis is performed for each polarization state (for example, for each symbol) that changes in time. The result of the analysis for each polarization state is, for example, stored in a storage unit (not illustrated in the figure) such as a memory provided in the analyzer 377. However, the storage unit may be provided outside the analyzer 377.

The analysis of the signal quality of the detection-oriented signal may be performed by acquiring an error vector, a bit error rate (BER), for example. When a symbol number is denoted by k (here, k is an integer or one or more), the error vector may be acquired by a subtraction of "a received detection-oriented signal R(k)–a transmitted detection-oriented signal T(k)", for example. A standard deviation of the amplitude of the error vector may be used as the reception signal characteristic, for example.

The transmission detection-oriented signal T(k) is an example of a known signal transmitted by the optical transmitter 10 as described above. The signal T(k) may be stored in the storage unit that stores the result of the analysis of the polarization state as described above in advance. However, the storage unit storing the transmission detection-oriented signal T(k) may be a storage unit other than the storage unit storing the result of the analysis of the polarization state.

The optical receiver 30 may be notified of the transmission detection-oriented signal T(k) by the optical transmitter 10 in advance. This notification may be performed by using, for example, supervisory signal light that is also called as supervisory (SV) light or optical supervisory channel (OSC) light. In other words, the transmission detection-oriented signal T(k) may be overlapped with (or mapped to) supervisory light that is transmitted from a source node of an optical transmission apparatus provided with the optical transmitter 10 to a destination node of an optical transmission apparatus provided with the optical receiver 30.

The optimal polarization state detector 378 detects an optimal polarization state based on each polarization state of the transmission data and the detection-oriented signal acquired by the compensators 371 and 375 and the analysis result (or the reception quality of the detection-oriented signal) for each time (for example, for each symbol) acquired by the analyzer 377. For example, among from a plurality of relations between the polarization state of transmission data and the polarization state of the detection-oriented signal for each time, the detector 378 may detect a relation of the specific polarization state which makes the reception signal quality of the detection-oriented signal to be the best.

The detection result is, for example, transmitted (fed back) to the optical transmitter 10 as optimal polarization state information. The feed-back (or notification) of the optimal polarization state information may be performed by using, for example, supervisory signal light, OSC light, or the like. In other words, the optimal polarization state information may be overlapped with (or mapped to) supervisory light that is transmitted from a source node of an optical transmission apparatus provided with the optical receiver 30 to a destination node of an optical transmission apparatus provided with the optical transmitter 10.

The detection-oriented signal quality analyzer 377 and the optimal polarization state detector 378 may be considered as a polarization state detector that detects a transmission polarization state of the optical transmitter 10, which indicates a relatively high signal quality of the transmission data, based on the reception characteristic of the detection-oriented signal.

Figure 8:
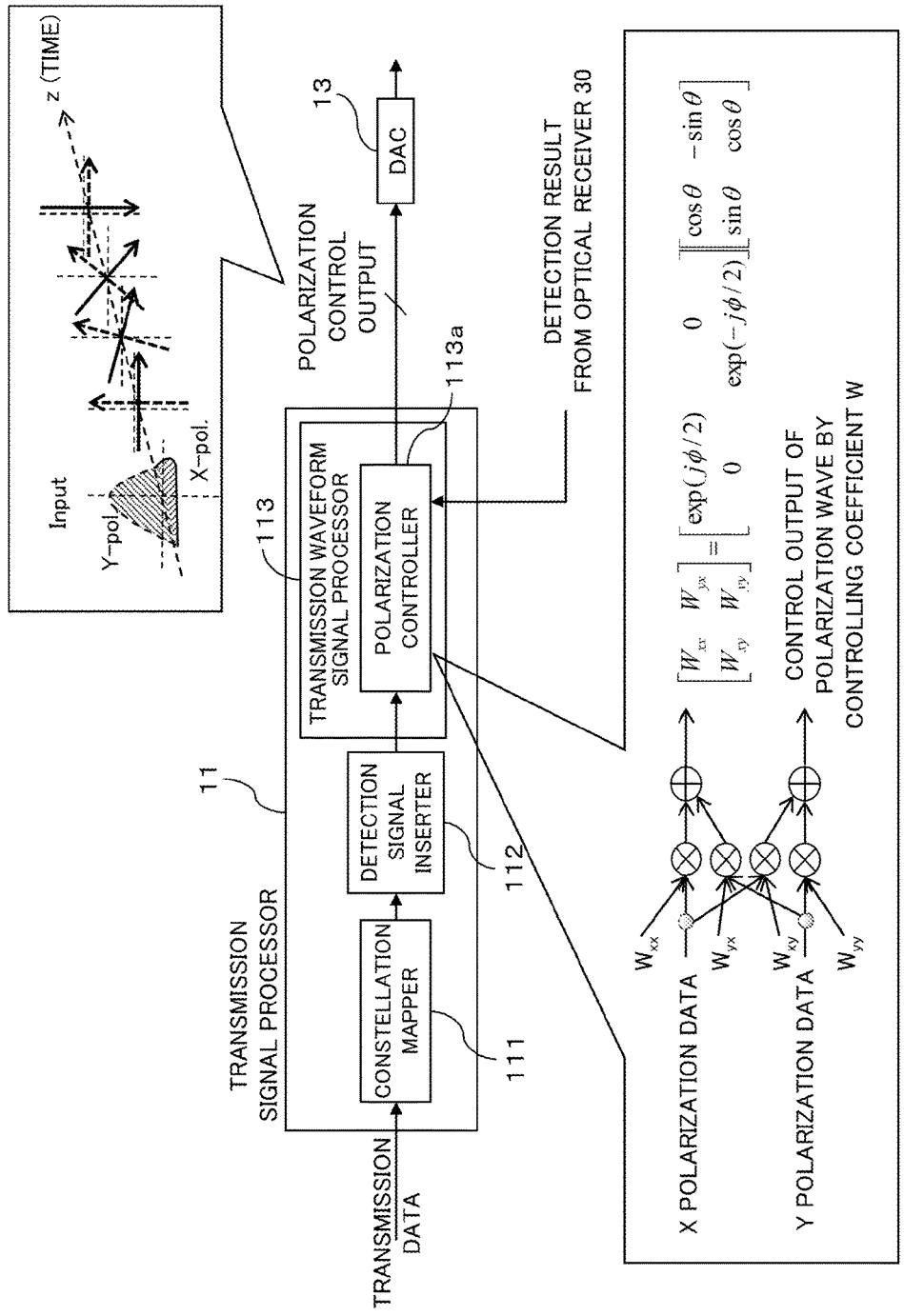
FIG. 8 is a block diagram that illustrates an exemplary configuration of the digital signal processor (transmission signal processor) of the optical transmitter illustrated in FIG. 1.

Next, FIG. 8 illustrates an exemplary configuration of the optical transmitter 10 focusing on the transmission signal processor 11 operable to control the polarization state of the transmission optical signal based on the optimal polarization state information detected by and notified from the optical receiver 30 as described above. The transmission signal processor 11 illustrated in FIG. 8 includes, for example, a polarization controller 113a in the transmission waveform signal processor 113 illustrated in FIG. 5.

The polarization controller 113a performs optimization control of the polarization state of the transmission data based on the optimal polarization state information notified (or fed back) from the optical receiver 30. For example, similar to the polarization control performed by the detection-oriented signal inserter 112 illustrated in FIG. 6 for the detection-oriented signal, the polarization controller 113a controls the polarization state of the transmission data to be the optimal transmission polarization state notified from the optical receiver 30 by controlling the coefficients Wxx, Wxy, Wyx, and Wyy represented in the aforementioned Formula 2.

In other words, the digital signal processor 37 of the optical receiver 30 may be considered as a control apparatus that controls the transmission polarization state of the optical receiver 30 to be the optimal transmission polarization state detected based on the reception characteristic of the detection-oriented signal as described above. This is also applied to first and second modified examples described later.

As described above, according to the embodiment, the optical transmitter 10 transmits an optical signal while relatively (in time) changing the polarization state of the detection-oriented signal with respect to the polarization state of the transmission data. The optical receiver 30 analyzes the reception characteristic of the detection-oriented signal, detects an optimal polarization state of the transmission data based on the result of the analysis, and notifies the optical transmitter 10 of the detected information. The optical transmitter 10 performs optimization control of the polarization state of the transmission data based on the notified information. Thus, even when polarization multiplexed signal light transmitted by the optical transmitter 10 is propagated through the optical transmission line 50 or a PDL medium such as the optical amplifier 70, it is possible to suppress (or minimize) the degradation of the quality of the optical signal due to a PDL.

(First Modified Example)

Figure 9:
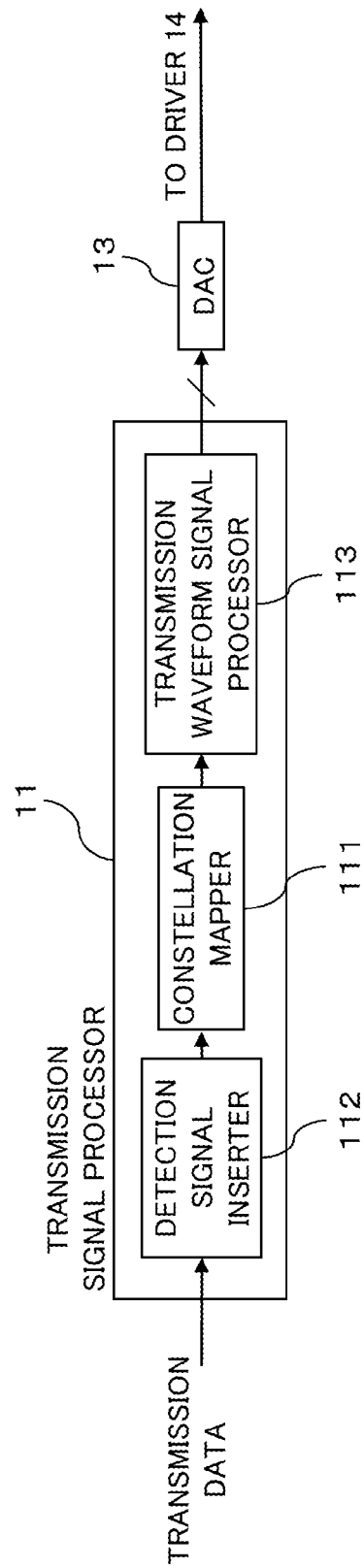
FIG. 9 is a block diagram that illustrates a first modified example of the transmission signal processor illustrated in FIG. 5.

In the transmission signal processor 11 illustrated in FIG. 5, the detection-oriented signal inserter 112 is provided on the rear stage of the mapper 111. However, as illustrated in FIG. 9, the detection-oriented signal inserter 112 may be provided on the front stage of the mapper 111. In other words, the detection-oriented signal may be inserted into the transmission data before being mapped to the IQ plane in time (for example, for each symbol) as a data pattern of which the polarization state changes.

In the configuration illustrated in FIG. 9, the detection-oriented signal inserter 112 inserts a data pattern of which the polarization state changes, for example, for each symbol into the transmission data before being mapped to symbols on the IQ plane.

The data pattern of which the polarization state changes in time can be generated by applying Stokes-vector-modulation, for example. Thus, the detection-oriented signal inserter 112 of this example may be referred to as a Stokes-vector-modulator 112.

The constellation mapper 111 maps the transmission data inserted with data patterns of which the polarization state changes for each symbol to symbols on the IQ plane.

The transmission waveform signal processor 113 performs, for example, a spectrum shaping process such as a Nyquist waveform shaping process, a skew compensating process, a band compensating process, and the like on the transmission data inserted with the detection-oriented signal and mapped to symbols on the IQ pane by the mapper 111.

Figure 10:
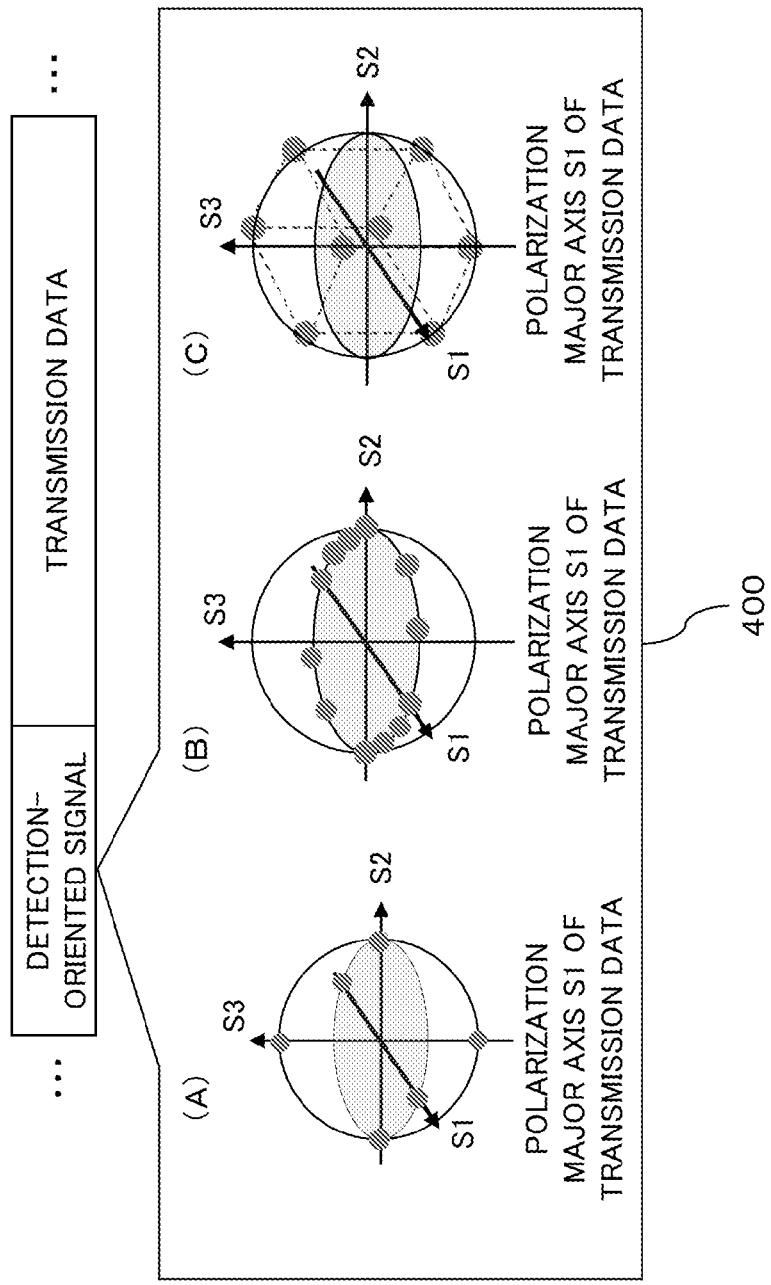
FIG. 10 is a diagram that illustrates Stokes-vector-modulation performed by the transmission signal processor for a detection-oriented signal illustrated in FIG. 9.

FIG. 10 schematically illustrates an example for applying the Stokes-vector-modulation to the detection-oriented signal. FIG. 10 schematically illustrates that a signal is mapped to electric field information in a three dimensional space (called as a Poincare sphere or a Stokes space) having three orthogonal axes defined by Stokes vectors S1, S2, and S3 as illustrated inside a frame 400. The three axes of the Poincare sphere may be respectively referred to as an S1 axis, an S2 axis, and an S3 axis.

Two intersections between the S1 axis and the Poincare sphere surface represent polarizations that are orthogonal to each other. For example, an intersection on the positive side of the S1 axis represents an X polarization, and an intersection on the negative side of the S1 axis represents a Y polarization orthogonal to the X polarization.

Two intersections between the S2 axis and the Poincare sphere surface represent 45 degrees linear polarizations having mutually-inversed signs. For example, an intersection on the positive side of the S2 axis represents a 45 degrees linear polarization, and an intersection on the negative side of the S2 axis represents a −45 degrees linear polarization.

Two intersections between the S3 axis and the Poincare sphere surface represent circular polarizations having mutually-inversed rotation directions. For example, an intersection on the positive side of the S3 axis represents a clockwise circular polarization, and an intersection on the negative side of the S3 axis represents a counterclockwise circular polarization.

The transmission data may be mapped, for example, to electric field information (or symbols) corresponding to the two intersections between the S1 axis and the surface of the Poincare sphere with the S1 axis being set as the main axis of the polarization. Meanwhile, the detection-oriented signal may be mapped to electric field information corresponding to an arbitrary polarization represented in the Poincare sphere. The mapping pattern may be a uniform pattern or a non-uniform pattern in the Poincare sphere.

In the example illustrated by (A) inside the frame 400 depicted in FIG. 10, the detection-oriented signal may be mapped to any of the following first to three intersection groups such that mapped patterns are different from each other in time. The first intersection group may correspond to the two intersections between the S1 axis and the surface of the Poincare sphere. The second intersection group may correspond to the two intersections between the S2 axis and the surface of the Poincare sphere. The third intersection group may correspond to the two intersections between the S3 axis and the surface of the Poincare sphere.

In the example illustrated by (B) inside the frame 400 depicted in FIG. 10, the detection-oriented signal may be mapped to electric field information corresponding to two points opposed to each other with respect to the center of a circle corresponding to the equator of the Poincare sphere such that mapped patterns are different from each other in time. In this case, symbols mapped with the detection-oriented signal may be arranged uniformly on the circle corresponding to the equator of the Poincare sphere.

In the example illustrated by (C) inside the frame 400 depicted in FIG. 10, the detection-oriented signal may be mapped to electric field information corresponding to any one of apexes of a rectangular parallelepiped illustrated by dotted lines in the Poincare sphere such that mapped patterns are different from each other in time.

Since the detection-oriented signal is used to detect an optimal polarization state of the transmission data, the detection-oriented signal is not necessary to be in a format capable of optimizing data rate.

The Stokes-vector-modulation as described above makes the polarization state of the detection-oriented signal possible to be different in time (for example, for each symbol) independently from the transmission data. Thereby, it is possible to reduce the influence of the transmission data on the reception quality characteristic. In addition, since the Stokes vector of an optical signal is determined by a phase difference and an amplitude ratio of two orthogonal polarizations, the Stokes vector does not depend on the absolute phase of light.

In other words, the absolute phase of the carrier is not used for the Stokes-vector-modulation. Thus, the process performed in the optical receiver 30 can be simplified, and accordingly, the load of the reception signal processing can be reduced. For example, as illustrated in FIG. 11, the above-described carrier frequency and phase synchronizer 376 (see FIG. 7) for the detection-oriented signal is not necessary in the optical receiver 30.

Figure 11:
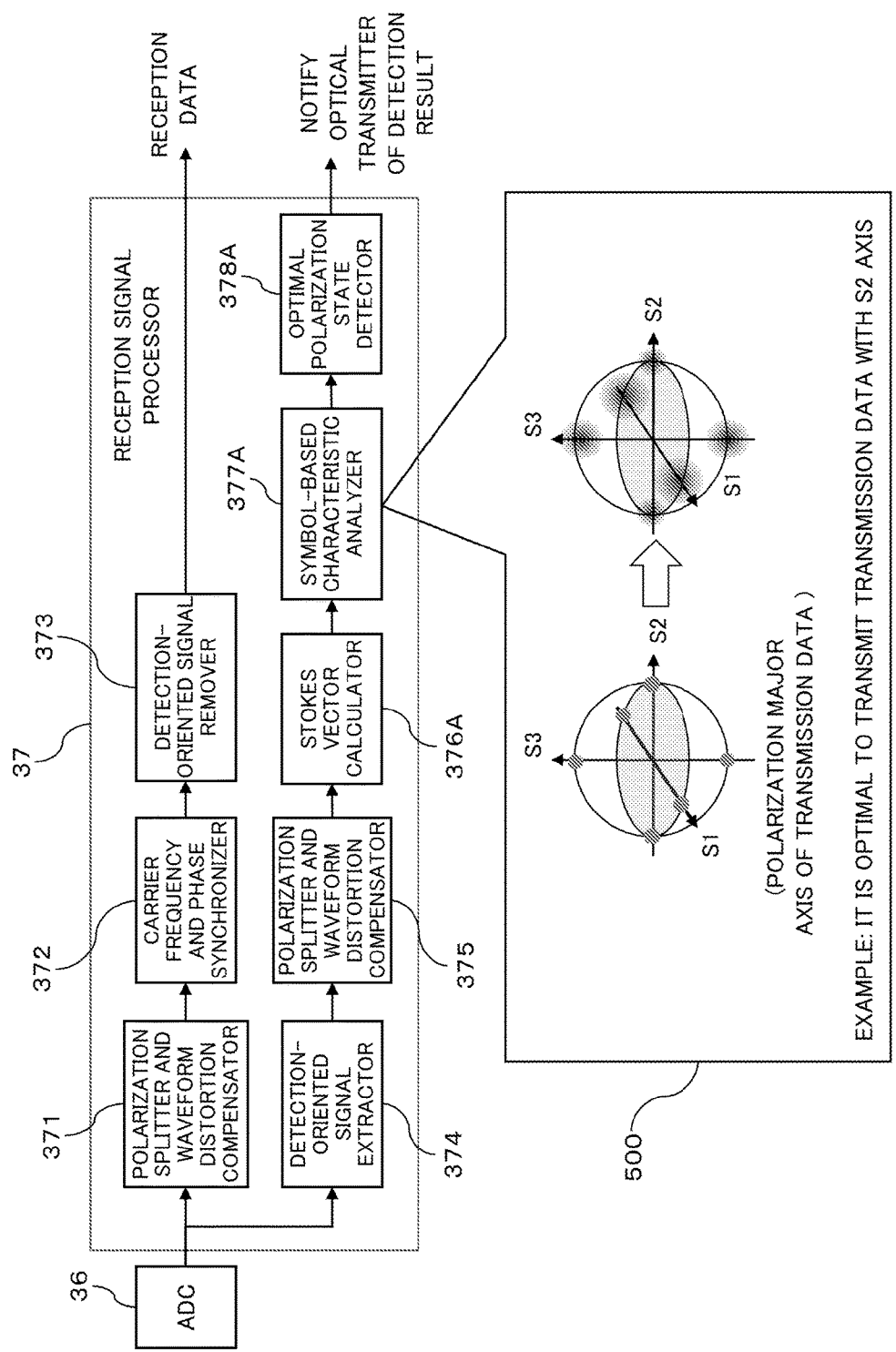
FIG. 11 is a block diagram that illustrates an exemplary configuration of a reception signal processor for the transmission signal processor illustrated in FIG. 9.

FIG. 11 is a block diagram that illustrates an exemplary configuration of the reception signal processor 37 used for the optical receiver 30 for the optical transmitter 10 that performs the Stokes-vector-modulation.

As illustrated in FIG. 11, the reception signal processor 37 for the detection-oriented signal is different in that a Stokes vector calculator 376A, a symbol-based characteristic analyzer 377A, and an optimal polarization state detector 378A are provided in comparison with the configuration illustrated in FIG. 7. Such units (or circuits) 376A to 378A may be considered as the aforementioned polarization state detector.

When electric field information corresponding to components of the X polarization and the Y polarization, for which the wave distortion has been compensated by the compensator 375, is denoted by Ex and Ey, the Stokes vector calculator 376A calculates Stokes vectors S1 to S3 represented by the following Formulas (3) to (5). Here, δ in Formulas (4) and (5) is represented by Formula (6).

$$S1=|Ex|^2-|Ey|^2 \quad (3)$$

$$S2=2|Ex||Ey|\cos\delta \quad (4)$$

$$S3=2|Ex||Ey|\sin\delta \quad (5)$$

$$\delta=\arg(Ey/Ex) \quad (6)$$

The symbol-based characteristic analyzer 377A analyzes a signal quality (or reception characteristic) of the detection-oriented signal for each symbol based on the Stokes vectors S1 to S3 calculated by the Stokes vector calculator 376A.

The analysis of the signal quality of the detection-oriented signal may be performed, for example, by acquiring an error vector, a BER, or the like. When a symbol number is denoted by k (here, k is an integer or one or more), the error vector may be acquired by a subtraction of "a received detection-oriented signal R(k)−a transmitted detection-oriented signal T(k)". For example, a standard deviation of the amplitude of the error vector may be used as the reception signal characteristic.

The optimal polarization state detector 378A may detect a polarization state in which the reception characteristic of the detection-oriented signal for each symbol is the best based on the analyzed result (the reception quality of the detection-oriented signal) acquired by the analyzer 377A for each symbol. The information indicative of the detected polarization state, similar to the embodiment described above, may be fed back (or notified) to the optical transmitter 10 as optimal polarization state information.

In a frame 500 illustrated in FIG. 11, an example is illustrated in which it is optimal to map the transmission data to electric field information corresponding to two intersections between the S2 axis the Poincare sphere when the Stokes-vector-modulation of the pattern (A) illustrated in FIG. 10 (frame 400) is applied to the detection-oriented signal.

In the embodiment and the first modified example described above, the patterns of the detection-oriented signal is changed for each symbol. However, the patterns of the detection-oriented signal may be changed in any other unit such as a frame unit. In such a case, the optical receiver 30 may detect an optimal transmission polarization state for the optical transmitter 10 by detecting a reception characteristic of the detection-oriented signal in the unit for the change.

In the configuration illustrated in FIG. 11, the polarization splitter and waveform distortion compensators 371 and 375 are respectively provided for the transmission data and the detection-oriented signal. In other words, the polarization splitting and the waveform distortion compensation are performed for each of the transmission data and the detection-oriented signal.

However, when the Stokes-vector-modulation is applied as described above, since the main axis (for example, the S1 axis) of the polarization of the transmission data can be locked by the polarization splitting performed on the reception side, it is possible to easily identify the mapped pattern illustrated in the frame 500 in FIG. 11.

Figure 12:
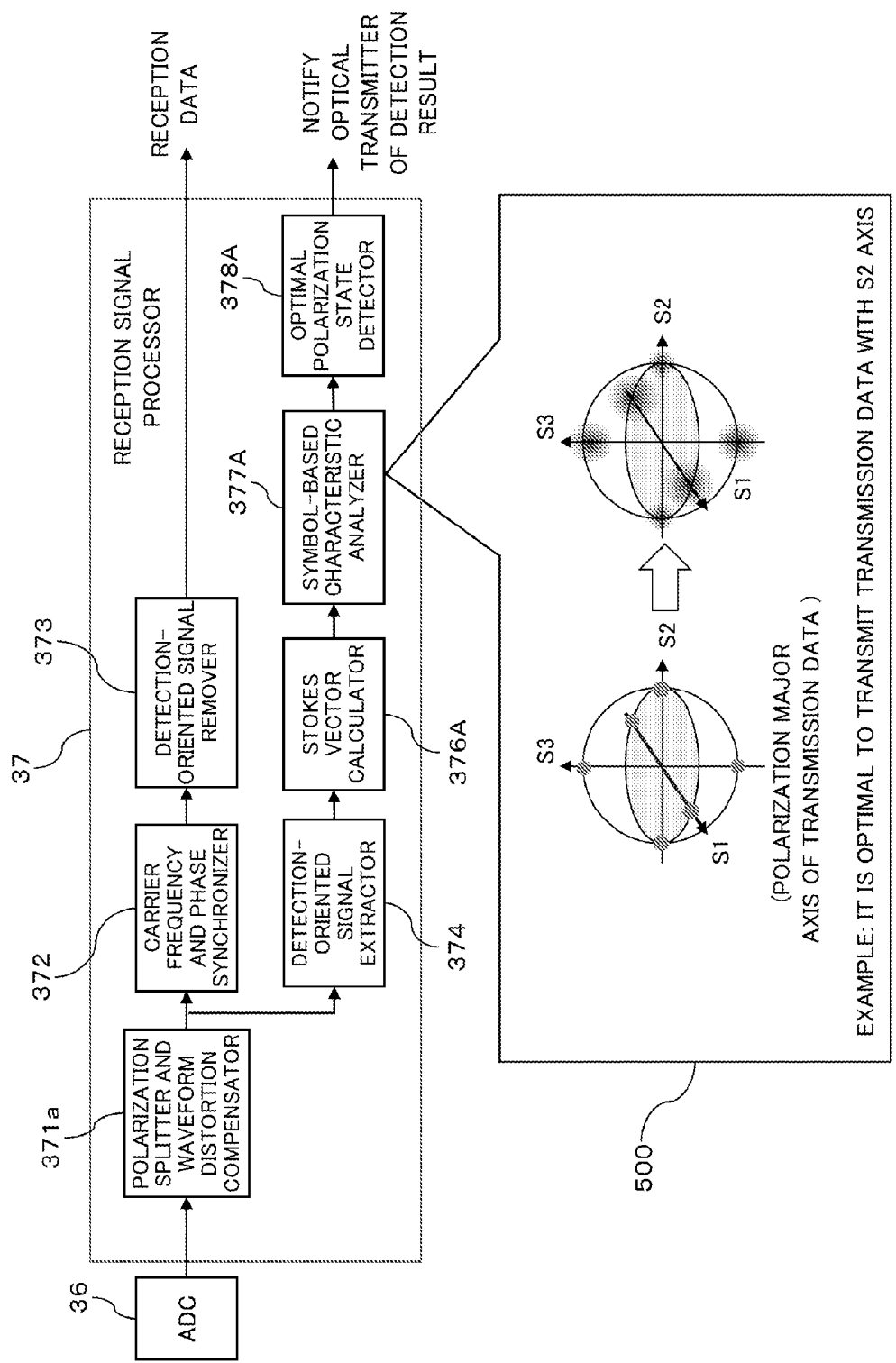
FIG. 12 is a block diagram that illustrates a modified example of the reception signal processor illustrated in FIG. 11.

Accordingly, as illustrated in FIG. 12, the polarization splitter and waveform distortion compensators 371 and 375 illustrated in FIG. 11 may be replaced by a polarization splitter and waveform distortion compensator 371a common to the transmission data and the detection-oriented signal. Since the circuit scale of the "polarization splitter and waveform distortion compensator" may easily increase compared to the other blocks, the above common configuration makes possible the reception signal processor 37 to be further simplified and low-cost.

(Second Modified Example)

Figure 13:
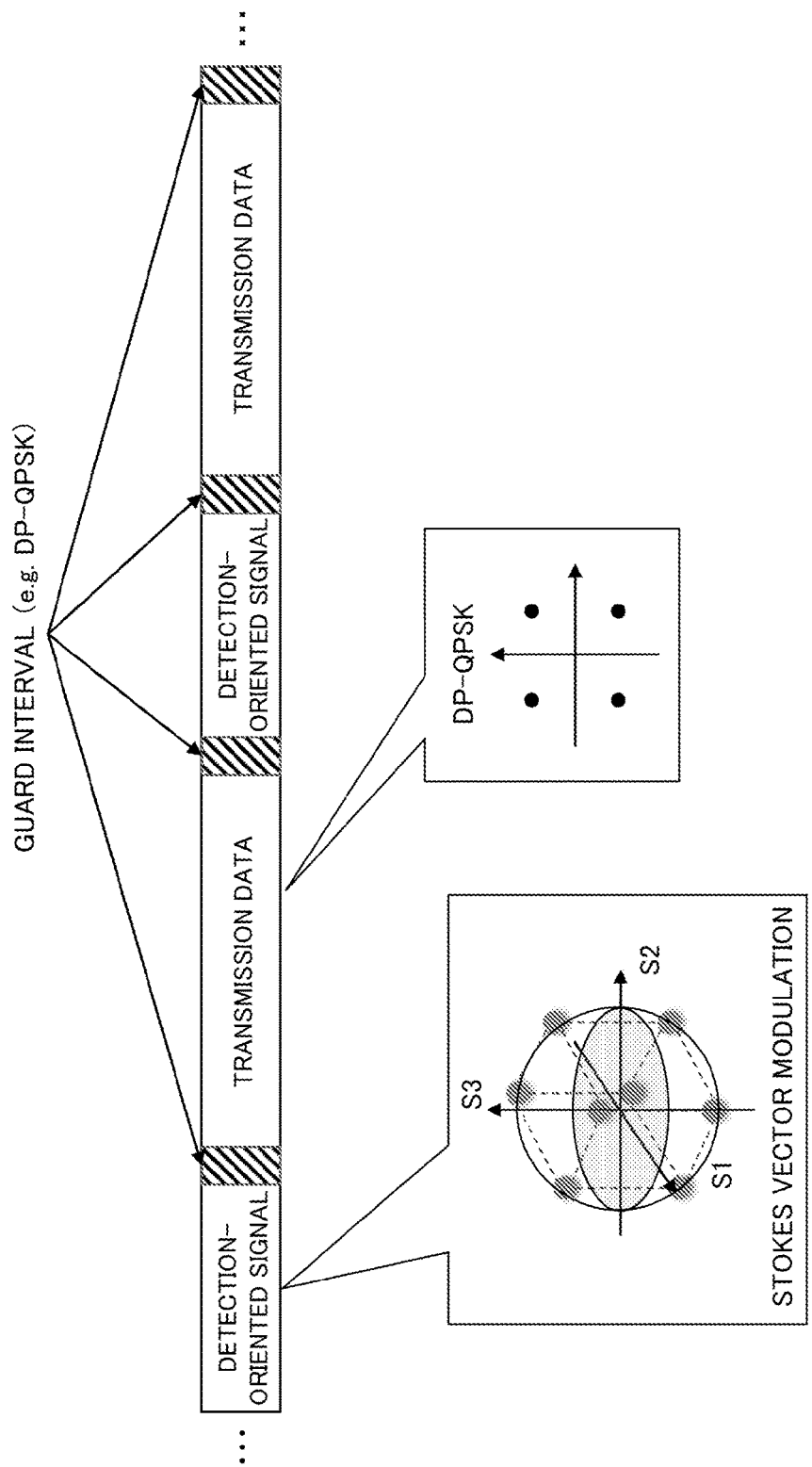
FIG. 13 is a diagram that illustrates an example of a transmission signal format according to a second modified example of the embodiment.

As illustrated in FIG. 13, mutually-different modulation schemes are applicable to the detection-oriented signal and the transmission data. As a non-limited example, the Stokes-vector-modulation may be applied to the detection-oriented signal, and DP-QPSK modulation may be applied to the transmission data.

In such a case, a guard interval may be arranged such that the transmission data is not subjected to a waveform distortion or the like by the detection-oriented signal. In the guard interval, for example, a dummy signal modulated by using the same modulation scheme (in the example illustrated in FIG. 13, the DP-QPSK) as that of the transmission data may be inserted (transmitted). The insertion of the dummy signal may be performed by the aforementioned detection-oriented signal inserter 112, for example.

Thereby, even when mutually-different modulation schemes are applied to the detection-oriented signal and the transmission data, it is possible to suppress the signal quality degradation of the transmission data.

(Others)

In the embodiment and the modified examples described above, the transmission period (or cycle) of the detection-oriented signal may be changed according to a transmission parameter such as a characteristic of the optical transmission line 50, for example. In addition, in the transmission signal format illustrated in FIGS. 4, 10, and 13, the occupancy ratio of the detection-oriented signal to the transmission data is not limited to a particular ratio. Here, as the occupancy ratio of the detection-oriented signal increases, the detection accuracy of the optical transmitter 10 for an optimal polarization state is improved; however, the transmission capacity of the transmission data decreases. Thus, there is a trade-off between the detection accuracy and the transmission capacity and the occupancy ratio may be optimized as is necessary.

According to the technology described above, it is possible to detect a specific polarization state available to suppress the degradation of the signal quality due to a polarization dependence loss of an optical signal.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A polarization state detector comprising:
    an analyzer configured to receive an optical signal including a transmission data signal and a monitor signal from an optical transmitter, the monitor signal being periodically transmitted between transmissions of a plurality of the transmission data signals, being controlled in the optical transmitter to be changed in a polarization state relative to a polarization state of the transmission data signal, and being a known signal between the polarization state detector and the optical transmitter, and to analyze a reception signal quality of the monitor signal for each different polarization state of the monitor signal; and
    a detector configured to detect, based on the analyzed result of the analyzer, the polarization state of the transmission data signal corresponding to the polarization state of the monitor signal indicative of a relatively higher reception signal quality among the plurality of the reception signal quality for the different polarization states,
    wherein the transmission data signal and the monitor signal are modulated by using mutually different modulation schemes,
    wherein a dummy signal modulated by using the same modulation scheme as that of the transmission data signal is transmitted by the optical transmitter between the transmission data signal and the monitor signal, and
    wherein the dummy signal is a dummy of the transmission data signal and is transmitted in a guard period provided between transmissions of the transmission data signal and the monitor signal.

2. The polarization state detector according to claim 1, wherein the monitor signal is modulated with a Stokes-vector-modulation.

3. An optical transmitter comprising:
    a signal processor configured to generate a transmission data signal and a monitor signal, the monitor signal being periodically transmitted between transmissions of a plurality of transmission data signals, being controlled in the optical transmitter to be changed in a polarization state relative to a polarization state of the transmission data signal, and being a known signal between a polarization state detector and the optical transmitter; and
    an optical modulator configured to modulate transmission light based on the transmission data signal and the monitor signal to generate transmission optical signals to be transmitted to the polarization state detector,
    wherein the signal processor is configured to modulate the transmission data signal and the monitor signal by using mutually different modulation schemes and to output a dummy signal modulated by using the same modulation scheme as that of the transmission data signal between the transmission data signal and the monitor signal.

4. The optical transmitter according to claim 3, wherein the signal processor includes a Stokes-vector-modulator configured to generate the monitor signal by using a Stokes-vector-modulation.

5. The optical transmitter according to claim 3, wherein the signal processor includes a polarization controller configured to receive the polarization state of the transmission data signal notified from an optical receiver and to control the polarization state of a transmission data signal to be transmitted based on the notified polarization state detected by the optical receiver that receives the transmission optical signals, and
    wherein the notified polarization state corresponds to the polarization state of the monitor signal at the optical receiver and is indicative of a relatively higher reception signal quality among a plurality of reception signal quality at the optical receiver for different polarization states caused by a polarization control performed by the polarization controller in the optical transmitter.

6. An optical receiver comprising:
    an analyzer configured to receive a transmission optical signal including a transmission data signal and a monitor signal transmitted from an optical transmitter and to analyze a reception signal quality of the monitor signal for each different polarization state of the monitor signal, the transmission data signal and the monitor signal, which are controlled in the optical transmitter, being generated by the optical transmitter, the monitor signal being periodically transmitted between transmissions of a plurality of the transmission data signals and being changed in a polarization state relative to a polarization state of the transmission data signal, and the transmission optical signal being generated by modulating transmission light based on the transmission data signal and the monitor signal by the optical transmitter; and
    a detector configured to detect, based on an analyzed result of the analyzer, the polarization state of the transmission data signal corresponding to the polarization state of the monitor signal indicative of a relatively higher reception signal quality among the plurality of the reception signal quality for the different polarization states, wherein the transmission data signal and the monitor signal are modulated by using mutually different modulation schemes, wherein a dummy signal modulated by using the same modulation scheme as that of the transmission data signal is transmitted by the optical transmitter between the transmission data signal and the monitor signal, and wherein the dummy signal is a dummy of the transmission data signal and is transmitted in a guard period provided between transmissions of the transmission data signal and the monitor signal.

7. The optical receiver according to claim 6, wherein the optical transmitter is notified of the polarization state detected by the detector by using supervisory light transmitted to the optical transmitter.

\* \* \* \* \*